US008042609B2

(12) United States Patent
Samie et al.

(10) Patent No.: US 8,042,609 B2
(45) Date of Patent: Oct. 25, 2011

(54) METHOD AND APPARATUS FOR IMPROVING VEHICLE FUEL ECONOMY

(75) Inventors: Farzad Samie, Franklin, MI (US); Richard W. Carlson, Joliet, IL (US)

(73) Assignee: GM Global Technology Operations LLC, Detroit, MI (US)

( * ) Notice: Subject to any disclaimer, the term of this patent is extended or adjusted under 35 U.S.C. 154(b) by 1107 days.

(21) Appl. No.: 11/426,624

(22) Filed: Jun. 27, 2006

(65) Prior Publication Data

US 2007/0295475 A1 Dec. 27, 2007

(51) Int. Cl.
*B60H 1/00* (2006.01)
*G05D 23/00* (2006.01)
*B60H 3/00* (2006.01)
*F01N 5/02* (2006.01)

(52) U.S. Cl. ............. 165/202; 165/42; 165/51; 165/300

(58) Field of Classification Search .................... 165/41, 165/42, 51, 103, 202, 204, 916, 300; 184/6.22; 123/142.5 R
See application file for complete search history.

(56) References Cited

U.S. PATENT DOCUMENTS

| 2,796,239 | A | * | 6/1957 | Holmes et al. ................. 165/164 |
| 5,408,965 | A | | 4/1995 | Fulton et al. |
| 5,937,817 | A | | 8/1999 | Schanz et al. |
| 6,427,640 | B1 | * | 8/2002 | Hickey et al. .............. 123/41.31 |
| 7,210,522 | B2 | * | 5/2007 | Gruian ........................... 165/202 |
| 2006/0060346 | A1 | * | 3/2006 | Sasaki ............................ 165/297 |

FOREIGN PATENT DOCUMENTS

| DE | 3201443 A1 | 5/1983 |
| DE | 3527020 A1 | 1/1987 |
| DE | 10019029 A1 | 10/2001 |
| DE | 10058110 A1 | 6/2002 |
| EP | 0785379 A | 7/1997 |
| GB | 2352806 A | 2/2001 |
| JP | 63225758 A | 9/1988 |

\* cited by examiner

*Primary Examiner* — Ljiljana Ciric
*Assistant Examiner* — Travis Ruby
(74) *Attorney, Agent, or Firm* — Quinn Law Group, PLLC

(57) ABSTRACT

The present invention provides an apparatus for improving the fuel economy of a vehicle. The apparatus includes a transmission having a transmission sump that contains transmission fluid, and a heat exchanger disposed within said sump and at least partially submerged in the transmission fluid. The apparatus also includes an engine having a plurality of engine coolant channels. An engine pump is operatively connected to the engine. The engine pump is configured to transfer engine coolant through the plurality of engine coolant channels and then through the heat exchanger. Heat from the engine coolant is transferred to the transmission fluid when the engine coolant passes through the heat exchanger. The heat transferred to the transmission fluid decreases transmission fluid viscosity such that transmission spin losses are reduced and fuel economy is improved. A corresponding method for improving the fuel economy of a vehicle is also provided.

3 Claims, 1 Drawing Sheet

METHOD AND APPARATUS FOR IMPROVING VEHICLE FUEL ECONOMY

TECHNICAL FIELD

The present invention pertains generally to a method and apparatus for improving the fuel economy of a vehicle during warm-up by absorbing heat from the vehicle's engine and transferring the absorbed heat to the vehicle's transmission.

BACKGROUND OF THE INVENTION

After a vehicle is started, it goes through a "warm-up" period during which component temperatures are increased from an ambient temperature to a steady state operating temperature. A vehicle's transmission fluid is one such component that is heated during the warm-up period. Until the transmission fluid is fully heated, its viscosity is increased and the spin losses of rotating components in contact with the transmission fluid are also increased. The increased spin losses during the warm-up period reduce efficiency and fuel economy of the vehicle.

SUMMARY OF THE INVENTION

The apparatus of the present invention is adapted to improve the fuel economy of a vehicle. The apparatus includes a transmission having a transmission sump that contains transmission fluid, and a heat exchanger disposed within said sump and at least partially submerged in the transmission fluid. The apparatus also includes an engine having a plurality of engine coolant channels. An engine pump is operatively connected to the engine. The engine pump is configured to transfer engine coolant through the plurality of engine coolant channels and then through the heat exchanger. Heat from the engine coolant is transferred to the transmission fluid when the engine coolant passes through the heat exchanger. The heat transferred to the transmission fluid decreases transmission fluid viscosity such that transmission spin losses are reduced and fuel economy is improved.

The apparatus may also include a first valve configured to selectively prevent the flow of engine coolant from the plurality of engine coolant channels to the heat exchanger.

The apparatus may also include a radiator operatively connected to the engine and configured to reduce the temperature of the engine.

The apparatus may also include a second valve configured to selectively prevent the flow of engine coolant from the plurality of engine coolant channels to the radiator.

The apparatus may also include a transmission fluid cooler operatively connected to the transmission.

The apparatus may also include a transmission pump configured to transfer transmission fluid from the sump to the transmission fluid cooler.

The apparatus may also include a third valve configured to selectively prevent the flow of transmission fluid from the sump to the transmission fluid cooler.

The present invention also provides a method for improving the fuel economy of a vehicle. The method includes providing engine coolant to absorb engine heat. A heat exchanger is at least partially submerged in transmission fluid within a transmission sump. The engine coolant is transferred through the heat exchanger such that heat from the engine coolant is absorbed by the transmission fluid. The heat absorbed by the transmission fluid causes a decrease in transmission fluid viscosity such that spin losses are reduced and fuel economy is improved.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
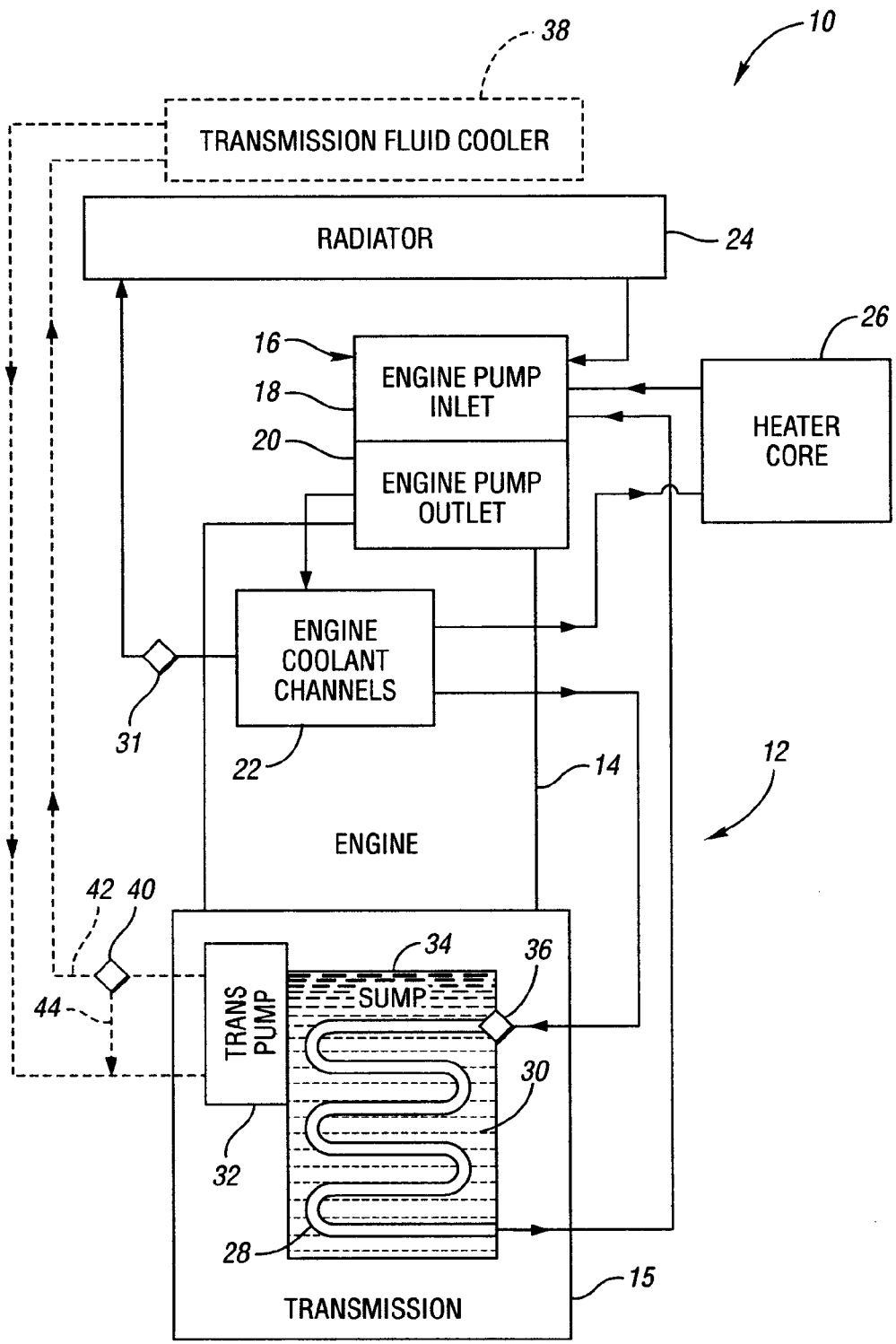
FIG. 1 is a schematic illustration of a vehicle powertrain in accordance with the present invention.

Referring to FIG. 1, a schematic representation of a vehicle 10 in accordance with the present invention is shown. A preferred embodiment of the vehicle 10 includes only those components identified with a solid line, while an alternate embodiment of the vehicle 10 includes the components identified with a solid line and the components identified with a dashed line.

The preferred embodiment of the vehicle 10 will be described first. As shown in FIG. 1, the vehicle 10 has a powertrain 12 which includes an internal combustion engine 14 or the like operatively connected to a transmission 15. An engine pump 16 operatively connected to the engine 14 includes a pump inlet 18 and a pump outlet 20.

The pump outlet 20 preferably transfers engine coolant (not shown) to one or more engine coolant channels 22 in order to cool the engine 14. More precisely, the coolant channels 22 circulate coolant throughout the engine 14 to absorb engine heat and thereby reduce engine temperature. During the process of absorbing engine heat, the temperature of the engine coolant is increased. The heated engine coolant is transferred under pressure from the engine pump 16 to a radiator 24, a heater core 26, and/or a heat exchanger 28. The radiator 24 is configured to reduce the temperature of the engine coolant in a conventional manner. The heater core 26 is generally part of a heating, ventilation and air conditioning (HVAC) system (not shown), and the heated coolant transferred thereto may be implemented to operate the heating portion of the HVAC system. The heat exchanger 28 is configured to transfer heat between the engine coolant and transmission fluid 30 as will be described in detail hereinafter.

As shown in FIG. 1 engine coolant (not shown) is preferably transferred from the engine coolant channels 22 to the heater core 26, and also from the engine coolant channels 22 to the heat exchanger 28. It should be appreciated, however, that alternate flow paths may be envisioned. As an example, the engine coolant may be transferred initially from the engine coolant channels 22 to the heater core 26, and thereafter from the heater core 26 to the heat exchanger 28. Conversely, the engine coolant may be transferred initially from the engine coolant channels 22 to the heat exchanger 28, and thereafter from the heat exchanger 28 to the heater core 26.

A valve or solenoid 31 is configured to block the transfer of engine coolant (not shown) from the coolant channels 22 to the radiator 24 until the engine coolant reaches a predetermined temperature. According to a preferred embodiment, the valve 31 is opened and closed by a control module (not shown) operatively connected thereto. The control module preferably measures or senses the temperature of the engine coolant with a temperature sensor (not shown) and holds the valve 31 closed until the predetermined temperature is reached. Therefore, when the engine coolant is at a relatively low temperature such as, for example, during the warm-up period, all of the coolant exiting the coolant channels 22 is transferred to the heater core 26 and/or to the heat exchanger 28. For purposes of the present invention, the "warm-up" period is the period during which vehicle component temperatures are increased from an ambient temperature to a steady state operating temperature.

The transmission 15 includes a transmission pump 32 in fluid communication with a sump or reservoir 34 containing transmission fluid 30. The transmission pump 32 is configured to draw transmission fluid 30 from the sump 34 and circulate it throughout the transmission 15 in order to meet any cooling, lubrication and/or pressure requirements desired. During the vehicle warm-up period, the temperature of the transmission fluid 30 is relatively low and its viscosity is correspondingly relatively high. The increased viscosity of the transmission fluid 30 generates additional spin losses within the transmission 15 and thereby reduces the fuel economy of the vehicle 10. Accordingly, by bringing the transmission fluid 30 up to its steady state operating temperature more quickly, transmission spin losses are minimized and fuel economy is improved.

The heat exchanger 28 is configured to more quickly heat the transmission fluid 30 during vehicle warm-up and thereby improve the fuel economy of the vehicle 10. The heat exchanger 28 is disposed within the sump 34 and is at least partially submerged in transmission fluid 30. Therefore, when heated engine coolant (not shown) from the engine coolant channels 22 is passed through the heat exchanger 28, engine coolant heat is transferred to the transmission fluid 30. This heat transfer acts to more quickly warm the transmission fluid 30 which reduces transmission spin losses and improves fuel economy.

A valve or solenoid 36 is preferably configured to block or close-off the transfer of engine coolant (not shown) from the coolant channels 22 to the heat exchanger 28 after the transmission fluid 30 reaches a first predefined temperature. The valve 36 may be implemented to avoid heating the transmission fluid 30 after the vehicle warm-up period is over. Advantageously, the valve 36 may be unblocked or re-opened after the transmission fluid 30 reaches a second predefined temperature in order to cool the transmission fluid 30. If, for example, the vehicle 10 is pulling a heavy load and/or is traveling uphill, the temperature of the transmission fluid 30 can exceed that of the engine coolant. Therefore, if the transmission fluid 30 becomes too hot, the valve 36 can be opened to allow the transfer of engine coolant through the heat exchanger 28 such that the relatively colder engine coolant may absorb heat from the relatively warmer transmission fluid 30.

An alternate embodiment of the vehicle 10 will now be described. The alternate embodiment of the vehicle 10 includes all of the components previously described with respect to the preferred embodiment, and also includes a transmission fluid cooler 38 shown with dashed lines in FIG. 1. As the transmission fluid 30 is circulated throughout the transmission 15 in order to meet any cooling, lubrication, and/or pressure requirements, the transmission fluid 30 may absorb heat. The transmission fluid cooler 38 is configured to reduce the temperature of the heated transmission fluid 30 in a conventional manner. The transmission pump 32 is selectively configured to either transfer the transmission fluid 30 to the transmission fluid cooler 38 via a first flow path 42, or to transfer the transmission fluid 30 back to the sump 34 via a second flow path 44 as will be described in detail hereinafter.

A valve or solenoid 40 is configured to direct the transmission fluid flow to one of the first and second flow paths 42, 44. More precisely, if the transmission fluid 30 is below its operating temperature, the valve 40 blocks the first flow path 42 and opens the second flow path 44 such that the transmission fluid cooler 38 is bypassed. After the transmission fluid 30 reaches its operating temperature, the valve 40 opens the first flow path 42 and blocks the second flow path 44 such that the transmission fluid 30 is passed through the transmission fluid cooler 38. Bypassing the fluid cooler 38 during the warm-up period increases the rate at which the transmission fluid 30 is heated and thereby improves the vehicle fuel economy in the manner previously described.

While the best modes for carrying out the invention have been described in detail, those familiar with the art to which this invention relates will recognize various alternative designs and embodiments for practicing the invention within the scope of the appended claims.

The invention claimed is:

1. A method for improving the fuel economy of a vehicle comprising:

providing an engine coolant to absorb heat from an engine;

providing a heat exchanger in fluid communication with the engine coolant, the heat exchanger being at least partially submerged in a transmission fluid within a transmission sump; and transferring the engine coolant through the heat exchanger such that heat from the engine coolant is absorbed by the transmission fluid until the transmission fluid reaches a first predefined temperature, wherein a viscosity of the transmission fluid is decreased thereby reducing spin losses and improving fuel economy;

blocking and preventing, via a valve, the transfer of the engine coolant to the heat exchanger after the transmission oil reaches the first predefined temperature, wherein the heat exchanger is disposed inside the transmission and is configured to transfer heat energy between the engine coolant and the transmission oil; and unblocking, via the valve, the transfer of the engine coolant to the heat exchanger when the transmission fluid reaches a second predefined temperature that exceeds the first predefined temperature and the temperature of the engine coolant.

2. The method of claim 1, wherein said transferring the engine coolant includes implementing an engine pump to transfer the engine coolant.

3. The method of claim 1, wherein the selectively blocking the transfer of the engine coolant to the heat exchanger is after an engine warm-up period and between periods of heavy vehicle load.

\* \* \* \* \*